(12) United States Patent
Bohling et al.

(10) Patent No.: US 9,221,992 B2
(45) Date of Patent: Dec. 29, 2015

(54) AQUEOUS COATING COMPOSITIONS

(75) Inventors: James C. Bohling, Lansdale, PA (US); Arnold S. Brownell, Lansdale, PA (US); Catherine A. Finegan, Warrington, PA (US); Ozzie M. Pressley, Cheltenham, PA (US); Wei Zhang, Maple Glen, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/119,905

(22) PCT Filed: May 31, 2012

(86) PCT No.: PCT/US2012/040061
§ 371 (c)(1),
(2), (4) Date: Nov. 25, 2013

(87) PCT Pub. No.: WO2012/166830
PCT Pub. Date: Dec. 6, 2012

(65) Prior Publication Data
US 2014/0187706 A1    Jul. 3, 2014

Related U.S. Application Data

(60) Provisional application No. 61/494,598, filed on Jun. 8, 2011, provisional application No. 61/493,088, filed on Jun. 3, 2011.

(51) Int. Cl.
*C09D 133/12* (2006.01)
*C09D 5/02* (2006.01)
*C09D 7/12* (2006.01)
*C08F 2/38* (2006.01)
*C08F 265/06* (2006.01)
*C09D 151/00* (2006.01)

(52) U.S. Cl.
CPC .............. *C09D 133/12* (2013.01); *C08F 2/38* (2013.01); *C08F 265/06* (2013.01); *C09D 5/028* (2013.01); *C09D 7/1225* (2013.01); *C09D 151/003* (2013.01)

(58) Field of Classification Search
CPC .............................. C09D 133/12; C09D 7/1225
USPC .......................................... 524/521; 427/385.5
See application file for complete search history.

(56) References Cited

U.S. PATENT DOCUMENTS

| | | | |
|---|---|---|---|
| 6,080,802 | A | 6/2000 | Emmons et al. |
| 6,218,456 | B1 | 4/2001 | Schlarb et al. |
| 6,492,451 | B1 | 12/2002 | Dersch et al. |
| 6,545,084 | B2 | 4/2003 | Brown et al. |
| 6,576,051 | B2 | 6/2003 | Bardman et al. |
| 6,589,650 | B1 | 7/2003 | Govek et al. |
| 6,589,651 | B2 | 7/2003 | Lau et al. |
| 7,179,531 | B2 | 2/2007 | Brown et al. |
| 7,285,590 | B2 | 10/2007 | Holub et al. |
| 2003/0018103 | A1 | 1/2003 | Bardman et al. |
| 2003/0045627 | A1* | 3/2003 | Rosano et al. ................. 524/547 |
| 2003/0177943 | A1 | 9/2003 | Auweter et al. |
| 2005/0203211 | A1 | 9/2005 | Gebhard |
| 2005/0222299 | A1 | 10/2005 | Garzon et al. |
| 2007/0043159 | A1 | 2/2007 | Bardman et al. |
| 2008/0146724 | A1 | 6/2008 | Bohling et al. |
| 2010/0010118 | A1 | 1/2010 | Bardman |
| 2010/0063171 | A1 | 3/2010 | Roschmann et al. |

FOREIGN PATENT DOCUMENTS

| | | | |
|---|---|---|---|
| EP | 0609756 | A2 | 8/1994 |
| EP | 1270687 | A2 | 1/2003 |

OTHER PUBLICATIONS

Yu et al., "Opacity of P(MMA-MAA)-PMMA Composite Latex System with Varying MAA Concentration," Philippine Journal of Science, 140 (2), Dec. 2011, pp. 221-230.

* cited by examiner

*Primary Examiner* — James J Seidleck
*Assistant Examiner* — Deve E Valdez
(74) *Attorney, Agent, or Firm* — Karl E. Stauss; Ronald D. Bakule

(57) ABSTRACT

An aqueous coating composition including a) a composite particle including an opacifying pigment particle such as, for example, TiO2 and, disposed thereon, a plurality of particles of a first polymer, the first polymer being a select P-acid containing emulsion polymer and b) from 7% to 25% by weight, based on the total weight of polymer in the aqueous coating composition, of a select second polymer is provided. A method for forming the aqueous coating composition, a method for forming a dried coating therefrom, and the coating so formed are also provided.

6 Claims, No Drawings

AQUEOUS COATING COMPOSITIONS

This invention relates to an aqueous coating composition including: a) a composite particle, the composite particle including an opacifying pigment particle and a plurality of particles of a first polymer, the first polymer being an emulsion polymer including, as copolymerized units, from 0.35% to 5%, by weight P-acid monomer, based on the weight of the emulsion polymer; and b) from 7% to 25% by weight, based on the total weight of polymer in the aqueous coating composition, second polymer including, as copolymerized units, from 5% to 20%, by weight based on the weight of the second polymer, carboxylic acid monomer, wherein the second polymer has a calculated Tg of from 50° C. to 150° C., wherein the second polymer is substantially free from copolymerized P-acid monomer, and wherein the second polymer has a calculated molecular weight of from 2000 to 5500. The invention also relates to a method for forming the aqueous coating composition, a method for providing a coating, and a coating.

An example of an opacifying pigment is titanium dioxide (TiO2). TiO2 is an expensive component of many coatings or paints. The efficacy of the TiO2 as a hiding pigment is reduced when TiO2 particles are allowed to come too close together upon film formation and drying (which they tend to do). It has been disclosed that the spacing of TiO2 and its resultant efficiency can be improved by employing an adsorbing emulsion polymer. Prior efforts employed hard and/or cross-linked adsorbing emulsion polymers which are not desirable in paints, particularly in low VOC paints. Hardness or cross-linking was employed because one would expect these features to achieve spacing from an adsorbed emulsion polymer that would not collapse upon film formation.

U.S. Pat. No. 7,179,531 discloses polymer particles having select functional or absorbing groups useful for preparing organic-inorganic composite particles that are suitable for providing dried coatings with improved hiding. It was disclosed that significant improvements in TiO2 hiding efficacy could be attained with a relatively low Tg, substantially uncross-linked emulsion polymer. Improvement in the freeze-thaw stability of the aqueous coating compositions including such composite particles was still sought. The incorporation of certain second polymer in the aqueous coating composition herein has been shown to provide such a desirable improvement.

In a first aspect of the present invention, there is provided an aqueous coating composition comprising: a) a composite particle comprising an opacifying pigment particle and a plurality of particles of a first polymer, said first polymer being an emulsion polymer comprising, as copolymerized units, from 0.35% to 5%, by weight P-acid monomer, based on the weight of said emulsion polymer; and b) from 7% to 25% by weight, based on the total weight of polymer in said aqueous coating composition, second polymer comprising, as copolymerized units, from 5% to 20%, by weight based on the weight of said second polymer, acid monomer, wherein said second polymer has a calculated Tg of from 50° C. to 150° C., wherein said second polymer is substantially free from copolymerized P-acid monomer, and wherein said second polymer has a calculated molecular weight of from 2000 to 5500.

In a second aspect of the present invention there is provided a method for forming a coating composition comprising a method for forming an aqueous coating composition comprising: a) forming a first polymer, said first polymer being an emulsion polymer comprising, as copolymerized units, from 0.35% to 5%, by weight P-acid monomer, based on the weight of said emulsion polymer; b) contacting an opacifying pigment particle with a plurality of particles of said first polymer to form a composite particle; c) contacting said composite particle with from 7% to 25% by weight, based on the total weight of polymer in said aqueous coating composition, second polymer comprising, as copolymerized units, from 5% to 20%, by weight based on the weight of said second polymer, acid monomer, wherein said second polymer has a calculated Tg of from 50° C. to 150° C., wherein said second polymer is substantially free from copolymerized P-acid monomer, and wherein said second polymer has a calculated molecular weight of from 2000 to 5500.

In a third aspect of the present invention there is provided a method for providing a coating comprising: (a) forming the aqueous coating composition of the first aspect of the present invention; (b) applying said aqueous coating composition to a substrate; and (c) drying, or allowing to dry, said applied aqueous coating composition.

In a fourth aspect of the present invention there is provided a coating formed by the method of the third aspect of the present invention.

The present invention relates to an aqueous coating composition including a composite particle. By "aqueous medium" herein is meant water and from 0% to 30%, by weight based on the weight of the medium, of water-miscible compound(s). The composite particle includes an opacifying pigment particle and a plurality of particles of a first polymer disposed thereon. Without being bound by a specific theory it is believed that the composite particle includes a central opacifying pigment particle bearing adsorbed first polymer particles, although "central" is not meant to indicate a perfectly symmetrical composite particle.

The first polymer is a polymer formed by emulsion polymerization in an aqueous medium. The first polymer of the present invention includes, as copolymerized units, from 0.35% to 5%, preferably from 1% to 2.2%, P-acid monomer, by weight based on the weight of the emulsion polymer; typically from 0% to 0.05%, preferably 0%, by weight, multiethylenically unsaturated monomer, based on the weight of the first polymer; and at least one second monoethylenically unsaturated monomer.

By "P-acid monomer" herein is meant a phosphorus-containing acid monomer the monomer containing at least one ethylenic unsaturation and a phosphorus acid group. The phosphorus acid monomer may be in the acid form or as a salt of the phosphorus acid groups. Examples of phosphorus acid monomers include:

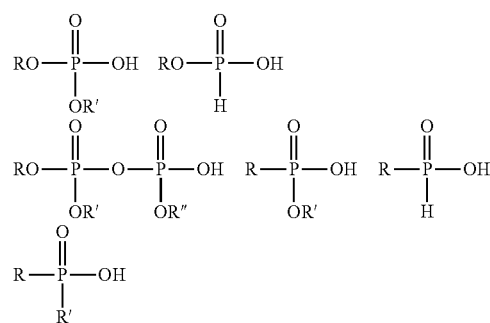

wherein R is an organic group containing an acryloxy, methacryloxy, or a vinyl group; and R' and R" are independently selected from H and a second organic group. The second organic group may be saturated or unsaturated.

Suitable phosphorus acid monomers include dihydrogen phosphate-functional monomers such as dihydrogen phosphate esters of an alcohol in which the alcohol also contains a polymerizable vinyl or olefinic group, such as allyl phosphate, mono- or diphosphate of bis(hydroxy-methyl)fumarate or itaconate, derivatives of (meth)acrylic acid esters, such as, for examples phosphates of hydroxyalkyl(meth)acrylates including 2-hydroxyethyl (meth)acrylate, 3-hydroxypropyl (meth)acrylates, and the like. Other suitable phosphorous acid monomers include CH2=C(R)—C(O)—O—(R1O)n-P(O)(OH)2, where R=H or CH3 and R1=alkyl, such as the methacrylates SIPOMER™ PAM-100 and SIPOMER™ PAM-200 and the acrylate SIPOMER™ PAM-300, available from Rhodia, Inc. Other suitable phosphorus acid monomers are phosphonate functional monomers, disclosed in WO 99/25780 A1, and include vinyl phosphonic acid, allyl phosphonic acid, 2-acrylamido-2-methylpropanephosphonic acid, α-phosphonostyrene, 2-methylacrylamido-2-methylpropanephosphonic acid. Further suitable phosphorus functional monomers are 1,2-ethylenically unsaturated (hydroxy) phosphinylalkyl (meth)acrylate monomers, disclosed in U.S. Pat. No. 4,733,005, and include (hydroxy)phosphinylmethyl methacrylate. Preferred phosphorus acid monomers are dihydrogen phosphate monomers, which include 2-phosphoethyl (meth)acrylate, 2-phosphopropyl (meth)acrylate, 3-phosphopropyl (meth)acrylate, and 3-phospho-2-hydroxypropyl (meth)acrylate. Preferred are 2-phosphoethyl (meth)acrylate, 2-phosphopropyl (meth)acrylate, 3-phosphopropyl (meth) acrylate, 3-phospho-2-hydroxypropyl (meth)acrylate, SIPOMER™ PAM-100, and SIPOMER™ PAM-200.

Multiethylenically unsaturated monomers include, for example, allyl (meth)acrylate, diallyl phthalate, butadiene, 1,4-butylene glycol di(meth)acrylate, 1,2-ethylene glycol di(meth)acrylate, 1,6-hexanediol di(meth)acrylate, and divinyl benzene. Multiethylenically unsaturated monomers herein expressly exclude P-containing multiethylenically unsaturated monomers such as multiethylenically unsaturated PEM diesters, and the like.

The at least one copolymerized second monoethylenically unsaturated monomer excludes acid group containing monomers such as, for example, P-acid monomers and multiethylenically unsaturated monomers and includes, for example, a (meth)acrylic ester monomer including methyl (meth)acrylate, ethyl (meth)acrylate, butyl (meth)acrylate, 2-ethylhexyl (meth)acrylate, decyl (meth)acrylate, hydroxyethyl (meth)acrylate, hydroxypropyl (meth)acrylate, ureido-functional (meth)acrylates and acetoacetates, acetamides or cyanoacetates of (meth)acrylic acid; styrene or substituted styrenes; vinyl toluene; butadiene; vinyl acetate or other vinyl esters; vinyl monomers such as vinyl chloride, vinylidene chloride, N-vinyl pyrollidone; (meth)acrylonitrile; and N-alkylol (meth)acrylamide. The use of the term "(meth)" followed by another term such as (meth)acrylate or (meth)acrylamide, as used throughout the disclosure, refers to both acrylates or acrylamides and methacrylates and methacrylamides, respectively. Preferred are first polymers the backbones of which are predominantly acrylic or styrene-acrylic compositions.

In certain embodiments of the invention the first polymer includes from 0.01% to 1%, by weight, based on the weight of said first polymer, second acid-containing monomer. The second acid-containing monomer excludes P-acid monomer, but includes carboxylic acid monomers such as, for example, acrylic acid, methacrylic acid, crotonic acid, itaconic acid, fumaric acid, maleic acid, monomethyl itaconate, monomethyl fumarate, monobutyl fumarate, and maleic anhydride; and sulfur-containing acid monomers. Preferred second acid-containing monomers are (meth)acrylic acid and sodium styrene sulfonate.

The calculated glass transition temperature ("Tg") of the first polymer is typically from −20° C. to 50° C., preferably from −10° C. to 35° C., and more preferably from −10° C. to 20° C. Tgs of all polymers herein are calculated by using the Fox equation (T. G. Fox, Bull. Am. Physics Soc., Volume 1, Issue No. 3, page 123(1956)), that is, for calculating the Tg of a copolymer of monomers M1 and M2, $$1/Tg(calc.) = w(M1)/Tg(M1) + w(M2)/Tg(M2),$$

wherein
Tg(calc.) is the glass transition temperature calculated for the copolymer
w(M1) is the weight fraction of monomer M1 in the copolymer
w(M2) is the weight fraction of monomer M2 in the copolymer
Tg(M1) is the glass transition temperature of the homopolymer of M1
Tg(M2) is the glass transition temperature of the homopolymer of M2,
all temperatures being in ° K.

The glass transition temperature of homopolymers may be found, for example, in "Polymer Handbook", edited by J. Brandrup and E. H. Immergut, Interscience Publishers.

The emulsion polymerization techniques typically used in the method for forming the first polymer of the present invention are well known in the art such as, for example, as disclosed in U.S. Pat. Nos. 4,325,856; 4,654,397; and 4,814,373. Conventional surfactants may be used such as, for example, anionic and/or nonionic emulsifiers such as, for example, alkali metal, or ammonium, alkyl, or ethoxylated alkyl, sulfates, alkyl sulfonic acids, fatty acids, phosphate surfactants such as, for example, Rhodfac™ RS-610 and RHODOFAC™ RS-960 and oxyethylated alkyl phenols. The amount of surfactant used is usually 0.1% to 6% by weight, based on the weight of total monomer. Either thermal or redox initiation processes may be used. Conventional free radical initiators, also referred to as catalysts, may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant, also referred to as an activator, such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. Chain transfer agents such as mercaptans may be used to lower the molecular weight of the polymers.

The monomers may be added individually or in monomer mixtures; they may be added neat or as an emulsion in water. In some embodiments the monomer is added in two or more stages. In certain embodiments the second monoethylenically unsaturated monomer may be added throughout the reaction; during a portion of the reaction, or stage, which corresponds to 10% to 50%, by weight of the total monomer addition, 75% to 100%, preferably from 90% to 100%, and more preferably 100%, by weight of the P-acid monomer may be added concurrently with the second monoethylenically unsaturated monomer. This use of a stage relatively rich in P-acid monomer is sometimes described as a "pulsed" addition of the P-acid monomer. In certain embodiments of the invention the pulse, or P-acid monomer-rich stage is begun at a point wherein from 0% to 65%, preferably from 0% to 40%, and more preferably from 0% to 30%, by weight of the total added monomer has already been added. That is, it is preferable that the P-acid monomer pulse occurs relatively early in the reaction to form the multistage emulsion polymer.

Additional ingredients such as, for example, free radical initiators, oxidants, reducing agents, chain transfer agents, neutralizers, surfactants, and dispersants may be added prior to, during, or subsequent to any of the stages. Processes yielding polymodal particle size distributions such as those disclosed in U.S. Pat. Nos. 4,384,056 and 4,539,361, for example, may be employed.

The average particle diameter of the aqueous first polymer dispersion particles is typically from 30 nm to 500 nm, preferably from 75 nm to 300 nm, and more preferably from 90 nm to 250 nm as measured by a Brookhaven Model BI-90 Particle Sizer supplied by Brookhaven Instrument Corp., Holtsville, N.Y.

One component of the aqueous coating composition of the present invention is a composite particle including an opacifying pigment particle having a plurality of the first polymer particles disposed on the surface of the opacifying pigment particle. The opacifying pigment particle has a weight average particle diameter of from 0.005 to 5 microns and an index of refraction of from 1.8 to 3.5. By "opacifying" herein is meant that the particle engenders opacity when subject to light of a certain wavelength, not necessarily visible light. For example certain nano-particles included herein provide opacity when subject to light of wavelengths lower than the visible range. The shape of the pigment particles is not important. Suitable shapes for the pigment particles include spherical shapes, such as a regular sphere, an oblate sphere, a prolate sphere, and an irregular sphere; cubic shapes such as a regular cube and a rhombus; plate-like shapes including a flat plate, a concave plate, and a convex plate; and irregular shapes. The pigment particles having spherical shapes have weight average diameters in the range of from 5 nm to 5 micron, preferably in the range of from 100 nm to 500 nm, and more preferably, in the range of from 200 nm to 300 nm. Pigment particles having nonspherical shapes preferably have weight average diameters, defined as their maximum dimension, of from 5 nm to 5 micron, preferably up to 500 nm, and more preferably up to 300 nm. Information about the average diameters of pigment particles is typically provided by pigment particle suppliers. Suitable pigment particles have an index of refraction ($n_D$ measured at 20° C.) of from 1.8 to 3.5. Indices of refraction for various materials are listed in *CRC Handbook of Chemistry and Physics*, 80th Edition, D. R. Lide, editor, CRC Press, Boca Raton, Fla., 1999, pages 4-139 to 4-146.

Suitable opacifying pigment particles include zinc oxide, antimony oxide, zirconium oxide, chromium oxide, iron oxide, lead oxide, zinc sulfide, lithopone, and forms of titanium dioxide such as anatase and rutile. Preferably, the pigment particles are selected from titanium dioxide and lead oxide. More preferably, the pigment particles are selected from rutile titanium dioxide and anatase titanium dioxide. Most preferably, the pigment particles are rutile titanium dioxide. The pigment particles alternatively have a uniform composition, or a heterogeneous composition with two or more phases. Certain heterogeneous pigment particles have an inner core and surrounding shell structure wherein one type of pigment particle forms the core and another type of particle forms the shell. The core and shell heterogeneous pigment particles include core/shell particles having a shell completely or incompletely encapsulating the core; core/shell particles having more than one core; dipolar particles; and particles having multiple domains of one phase on the surface of the other phase. Pigment particles, such as titanium dioxide, can have at least one coating of one or more of silica, alumina, zinc oxide, and zirconia. For example, certain embodiments of titanium dioxide particles suitable for use in coatings of the present invention have a coating of silica and a coating of alumina.

The formation of the composite particle is carried out by contacting dispersed opacifying pigment particles with the first polymer particles, typically with conventional low shear mixers. The formation is benefited by a balance of reactivity between the opacifying pigment and latex; if the reaction is too rapid then paint make-ability will suffer and undesired grit will be formed. Alternately, if the reaction is too weak either no adsorption will take place or it will be slow, resulting in drifting viscosity and tint strength.

The aqueous coating composition further includes from 7% to 25% by weight, based on the total weight of polymer in the aqueous coating composition, second polymer including, as copolymerized units, from 5% to 20%, by weight based on the weight of the second polymer, carboxylic acid monomer, wherein the second polymer has a calculated Tg of from 50° C. to 150° C., preferably from 65° C. to 150° C., wherein the second polymer is substantially free from copolymerized P-acid monomer, and wherein the second polymer has a calculated molecular weight of from 2000 to 5500. Salts of the second polymer are also contemplated.

The second polymer includes as copolymerized units, from 5% to 20%, by weight based on the weight of the second polymer, carboxylic acid monomer such as, for example, acrylic acid, methacrylic acid, crotonic acid, itaconic acid, fumaric acid, maleic acid, monomethyl itaconate, monomethyl fumarate, monobutyl fumarate, and maleic anhydride. Preferred is (meth)acrylic acid. The second polymer may be formed by free radical solution or emulsion polymerization techniques as are known in the art. The second polymer further includes copolymerized monoethylenically unsaturated monomer such as, for example, a (meth)acrylic ester monomer including methyl (meth)acrylate, ethyl (meth)acrylate, butyl (meth)acrylate, 2-ethylhexyl (meth)acrylate, decyl (meth)acrylate, hydroxyethyl (meth)acrylate, hydroxypropyl (meth)acrylate, ureido-functional (meth)acrylates and acetoacetates, acetamides or cyanoacetates of (meth)acrylic acid; styrene or substituted styrenes; vinyl toluene; butadiene; vinyl acetate or other vinyl esters; vinyl monomers such as vinyl chloride, vinylidene chloride, N-vinyl pyrollidone; (meth)acrylonitrile; and N-alkylol (meth)acrylamide. Preferably no milti-ethylenically unsaturated monomer is used.

The second polymer is substantially free from copolymerized P-acid monomer; the second polymer typically includes from 0% to 1%, preferably from 0% to 0.1%, and more preferably from 0% to 0.01%, by weight, based on the weight of the second polymer, P-acid monomer. P-acid monomers are as detailed hereinabove for the first polymer.

The second polymer has a calculated Tg of from 50° C. to 150° C., preferably from 65° C. to 150° C., as calculated using the Fox equation, as detailed hereinabove for the first polymer. No allowance in the Tg calculation is made for the molecular weight of the second polymer nor is any contribution to the Tg from chain ends resulting from the incorporation of end groups derived from any chain transfer agent. The Tg of salts of the second polymer are calculated as if they were in the free acid form.

The second polymer has a calculated molecular weight of from 2000 to 5500. Calculated molecular weights lower than about 50,000 are typically achieved by using a chain transfer agent. By "calculated molecular weight" herein is meant the number average molecular weight calculated by determining the sum of the moles of each monomer used in forming the second polymer, and dividing by the moles of chain transfer agent used. If no moles of chain transfer agent are used the calculated Mn of the polymer is taken as 1,000,000. The chain transfer agent, if used, is typically selected from the thiols, such as, for example, dodecylmercaptan, butylmercaptopropionate, methylmercaptopropionate, mercaptopropionic acid, and the like.

It is contemplated that the second polymer herein may be provided to the aqueous coating composition by various avenues. For example, the three alternatives following are among those contemplated. The second polymer may be provided as a stand-alone polymer. The second polymer may be provided in conjuction with the first polymer wherein the second polymer has been used in the emulsion polymerization of the first polymer as a sole or partial stabilization agent; typically the second polymer in neutralized form is present during the emulsion polymerization of the first polymer. The second polymer may be provided in conjuction with a third polymer (commonly known in the coatings art as a letdown vehicle) wherein the second polymer has been used in the emulsion polymerization of the third polymer as a sole or partial stabilization agent; typically the second polymer in neutralized form is present during the emulsion polymerization of the third polymer. Preparation of emulsion polymers in conjuction with compositions such as the second polymer (related compositions are known in the art as alkali-dispersible polymers or alkali-soluble polymers) have been disclosed such as, for example, in U.S. Pat. Nos. 4,916,171 and 5,328,952. Alternatively, the first or third polymer may be formed by emulsion polymerization followed by a subsequent stage in which the second polymer is formed.

The aqueous coating composition may include inorganic particles in addition to the inorganic portion of the composite particles in an amount of from 0 to 95 volume %, based on the total dry volume of the aqueous composition and inorganic particles. Typically, the aqueous coating composition of this invention, when used to prepare dried coatings, has a solids level in the range of from 20 to 50 volume %, based on the volume of the aqueous composition. The pH of the aqueous coating composition is typically in the range of from 3 to 11, and preferably, in the range of from 7 to 10. A suitable viscosity range for the aqueous coating composition is from 50 to 130 Kreb units (KU), preferably from 70 to 120 KU, and more preferably from 90 to 110 KU.

Inorganic particles that may be used in addition to the composite particles include: pigments that are not opacifying pigments, such as are commonly known in the art as extenders.

The aqueous coating composition may optionally contain organic pigment particles. Suitable organic pigments also include plastic pigments such as solid bead pigments and microsphere pigments containing voids or vesicles. Examples of solid bead pigments include polystyrene and polyvinyl chloride beads. Examples of microsphere pigments, which include polymer particles containing one or more voids include ROPAQUE™ opaque polymer and vesiculated polymer particles.

The aqueous compositions are prepared by techniques which are well known in the coatings art. The opacifying pigment particles are typically are well dispersed in an aqueous medium under high shear such as is afforded by a COWLES (R) mixer. The first polymer and the opacifying pigment are combined under low shear stirring along with other coatings adjuvants as desired in various steps or sequences. The aqueous composition may contain, in addition to the first polymer, film-forming or non-film-forming solution or other emulsion polymers (sometimes referred to as third polymer or letdown vehicles herein) in an amount of 0% to 200% by weight of the first polymer of the present invention, and conventional coatings adjuvants such as, for example, emulsifiers, coalescing agents, plasticizers, antifreezes, curing agents, buffers, neutralizers, thickeners, photosensitive moieties, rheology modifiers, humectants, wetting agents, biocides, plasticizers, antifoaming agents, UV absorbers, fluorescent brighteners, light or heat stabilizers, biocides, chelating agents, dispersants, colorants, waxes, water-repellants, and anti-oxidants.

The aqueous composition optionally contains a volatile organic compound ("VOC"). A VOC is defined herein as a carbon containing compound that has a boiling point below 280° C. at atmospheric pressure. Water and ammonia are excluded from VOCs. Frequently a VOC is deliberately added to a paint or coating to improve the film properties of a coating or to aid in the application properties of the composition employed to prepare the coating. Examples are glycol ethers, organic esters, aromatic compounds, ethylene and propylene glycol, and aliphatic hydrocarbons.

In one embodiment, the aqueous composition contains up to 20 weight % VOC by weight based on the total weight of the aqueous coating composition; preferably the aqueous coating composition contains less than 5% VOC by weight based on the total weight of the aqueous coating composition; more preferably the aqueous coating composition contains less than 3% VOC by weight based on the total weight of the aqueous coating composition; even more preferably the aqueous coating composition contains less than 1.7% VOC by weight based on the total weight of the aqueous coating composition.

Typical methods of aqueous paint or coating preparation introduce adventitious VOCs from the preparation of the aqueous composition, biocides, defoamers, soaps, dispersants, and thickeners. These typically account for 0.2% VOC by weight based on the total weight of the aqueous coating composition. Additional methods such as steam stripping and choice of low VOC containing additives like biocides, defoamers, soaps, dispersants, and thickeners are suitable for further reducing the aqueous coating composition to less than 0.05% VOC by weight based on the total weight of the aqueous coating composition. In one embodiment, the aqueous coating composition has less than 0.1% VOC by weight based on the total weight of the aqueous coating composition.

Additionally, the low VOC aqueous coating composition optionally contains coalescing agents that are not VOCs. A coalescing agent is a compound that is added to a water-borne emulsion polymer, paint, or coating, which reduces the minimum film forming temperature (MFFT) of the emulsion polymer, paint or coating by at least 1° C. The MFFT is measured using ASTM test method D2354. A non-VOC coalescing agent is a coalescing agent which has a boiling point above 280° C. at atmospheric pressure. Examples of coalescing agents that are not VOCs include plasticizers, low molecular weight polymers, surfactants, and autooxidizable plasticizers such as alkyl esters of unsaturated fatty acids. Preferred are alkyl esters prepared from oils such as linseed, tung, dehydrated castor, soybean, tall, sunflower, and corn. Suitable esters of unsaturated fatty acids includes alkyl esters such as, such as methyl and ethyl esters; substituted alkyl esters, such as esters formed from ethylene glycol and propylene glycol; and alkyl ether esters of unsaturated fatty acids, diethylene glycol, triethylene glycol, dipropylene glycol, tripropylene glycol, and diethylene glycol monobutyl ether.

The coating composition of the present invention may also include encapsulated or partially encapsulated opacifying pigment particles For example, the coatings composition may include polymer-encapsulated opacifying pigment particles comprising i) opacifying pigment particles, such as titanium dioxide particles, having a diameter in the range of 100 nm to 500 nm and an index of refraction of at least 1.8; ii) an encapsulating polymer, and iii) a polymeric dispersant for the encapsulated opacifying pigment particles and the polymer. Such polymer-encapsulated opacifying pigment particles are described, for example, in U.S. Patent Publication US 2010/0298483 A1. In another example, the coating composition may include polymer-encapsulated opacifying pigment particles as described in WO 2007/112503A1.

Conventional coatings application methods such as, for example, brushing, rolling, and spraying methods such as, for example, air-atomized spray, air-assisted spray, airless spray, high volume low pressure spray, and air-assisted airless spray may be used to apply the aqueous composition of this invention. Additionally, for some systems, other application techniques may be used to apply the aqueous polymer composition, such as, caulk gun, roll coaters, and curtain coaters. The aqueous coating composition may be advantageously applied to substrates such as, for example, plastic, wood, metal, primed surfaces, previously painted surfaces, weathered painted surfaces, glass, elastomeric substrates, composites, and cementitious substrates. Drying is typically allowed to proceed under ambient conditions such as, for example, at 0° C. to 35° C. but may be accelerated with heat or low humidity.

EXPERIMENTAL TEST METHODS

Hiding S/Mil was evaluated following ASTM Test Method D-2805.70.
Tint Strength. Tint Strength was evaluated by a method adapted from ASTM D 2745-89.
1. Each of the coatings being compared was tinted at a level of 2.00 oz/gallon or other desired level with the desired colorant.
2. The container was vibrated by hand to make certain that the colorant settled into the paint.
3. The sample was placed on a mechanical shaker for 5 minutes.
4. Thick (3 mil Bird Film Applicator or greater) drawdowns of the tinted paints were made and allowed to dry under controlled conditions (75 F/50% RH) for 7 days.
5. The Y-reflectance (R) was measured in 3 areas of the paint drawdown and the average number reported.

Tint strength was calculated as:

$$TS=((R_2)/(1-R_2)^2)\times((1-R_1)^2/(R_1))\times 100$$

where coating 1 was the standard, and coating 2 was the tested paint.
Scrub Resistance Test: (Based on ASTM D 2486-06)
Preparation of Apparatus: Abrasion Tester—An abrasion testing device was used which consisted of a brush clamped into a bracket which was moved back and forth over the dried, applied paint film by means of a set of cables on either side. The abrasion tester was leveled before use and operated at 37±1 cycles/minute. A 6½"×17½" Aluminum plate with two 10 mils×½"×6½" metal shims was used. Brush—The bristles, if new, were leveled before use to permit uniform wear on the paint surface. Leveling was accomplished by running the brush over 100 or 120 mesh aluminum oxide close grain sandpaper.
Test: The aqueous coating composition was drawn down on a black vinyl chart (Type P-121-10N, The Leneta Company) using 178 μm (7 mil) opening of a 7/10 Dow film caster, starting from the secured end of the panel. The time for application was 3 to 4 seconds from end to end. Three drawdowns were made for each sample. They were air-dried in a horizontal position for 7 days in an open room kept at ambient conditions.

Each chart was cut in half lengthwise for a total of six strips. A minimum of three strips was tested, one from each chart. The drawdown was secured to the abrasion tester by using a gasketed frame and brass weights or clamps. The brush was mounted in the holder. 10 g of abrasive scrub medium (Type SC-2, The Leneta Company) was spread evenly on the brush bristles. The brush was placed at the center of the path bristle side up when applying the scrub medium and water, then carefully turned bristle-side down. The test was started. After each 400 cycles before failure, the brush was removed; 10 g of stirred scrub medium added; and the brush replaced. 5 ml of water were placed on the brush before continuing. The total number of cycles to remove the paint fully in one continuous line ("cut-through") was recorded for each shim. The scrub removal cycles were reported by calculating the total average cut-through from all strips. A minimum of six measurements was used.

Freeze/Thaw Test Method. Samples were prepared by filling half-pint metal containers 75% full with the test aqueous coating composition. The KU viscosity was measured. The containers were sealed and placed into a ° F. freezer for 16 hours. The containers were removed and allowed to thaw at ambient conditions for 8 hours. The aqueous coatings were hand-sheared and the appearance rated on a scale of 1-5, with a 5 indicating that the coating was smooth and creamy, a 3 indicating that the coating is usable but no longer smooth and creamy, and a 1 indicating that the coating has solidified. The KU viscosity of the coating was measured and a delta KU relative to the initial measurement was recorded. The freeze/thaw was repeated for three cycles.

The following examples serve to illustrate the invention.
Abbreviations Used
Ethyl acrylate EA
Butyl acrylate BA
Methyl methacrylate MMA
Methacrylic acid MAA
Ureido methacrylate UMA
Phosphoethyl methacrylate PEM
Sodium 4-vinylbenzenesulfonate (mixture of isomers) SSS
Surfactant B $C_{12}H_{25}EO_{(4-12)}$ sulfate
n-DDM n-dodecyl marcaptan
Sodium persulfate NaPS
Ammonium persulfate APS
Deionized water DI water
Based on total monomer botm
Formation of a First Polymer: A first monomer emulsion was prepared by mixing 200 g DI water, 28.25 g (30% active) anionic surfactant B, 285.6 g BA, 197.22 g MMA, 20.4 g (50% active) PEM, and 7.53 g (90% active) SSS. A second monomer emulsion was prepared by mixing 420 g DI water, 28.75 g (30% active) anionic surfactant B, 666.4 g BA, 515.15 g MMA, and 17 g (50% active) UMA. The reactor was a 5-liter, four necked round bottom flask equipped with a paddle stirrer, a thermometer, nitrogen inlet, and a reflux condenser. To the flask was added 900 g DI water and 11.3 g (30% active) anionic surfactant B. The contents of the flask were heated to 84° C. under a nitrogen atmosphere and stirring initiated. A portion of the first monomer emulsion (110 g) was then added, quickly followed by a solution of 3.35 g NaPS dissolved in 20 g DI water, and a rinse of 5 g DI water. After stirring for 10 minutes, the remainder of the first monomer emulsion, with a 25 g rinse, and an initiator solution of 0.40 g NaPS dissolved in 30 g DI water were added linearly and separately over 30 minutes. The contents of the flask were held at 84° C. for 20 minutes. After the 20 minute hold, a solution of 10 g (29% active) ammonium hydroxide and 10 g DI water was added to the flask linearly over a period of 10 minutes. After the ammonium hydroxide addition, the second monomer emulsion and an initiator solution containing 1.1 g NaPS dissolved in 80 g DI water were added linearly and separately to the flask over a period of 80 minutes. The contents of the flask were maintained at a temperature of 83-84° C. during the addition of the second monomer emulsion. When all additions were complete, the container containing the second monomer emulsion was rinsed with 25 g DI, which was then added to the flask. The contents of the flask were cooled to 65° C. and a catalyst/activator pair was added to the flask. 37 g (42% solids) of TAMOL™ 2002 was added. The polymer was then neutralized to pH 8.5 with a dilute potassium hydroxide solution. The measured particle size was 98 nm and the solids were 46.1%.

Formation of First Polymer Stabilized by Second Polymer. A first monomer emulsion was prepared by mixing 100 g DI water, 4.25 g (30% active) anionic surfactant B, 17 g BA, 140.25 g MMA, 12.75 g MAA, and 17 g of a mercaptan chain transfer agent. A second monomer emulsion was prepared by mixing 200 g DI water, 28.25 g (30% active) anionic surfactant B, 285.6 g BA, 197.22 g MMA, 20.4 g (65% active) PEM, and 7.53 g (90% active) sodium 4-vinylbenzenesulfonate. A third monomer emulsion was prepared by mixing 300 g DI water, 24.5 g (30% active) anionic surfactant B, 571 g BA, 440 g MMA, and 17 g (50% active) UMA. The reactor was a 5-liter, four necked round bottom flask equipped with a paddle stirrer, a thermometer, nitrogen inlet, and a reflux condenser. To the flask was added 900 g DI water and 17 g (30% active) anionic surfactant B. The contents of the flask were heated to 84° C. under a nitrogen atmosphere and stirring initiated. A solution of 1.3 g sodium carbonate dissolved in 20 g DI water was added to the flask, and this was followed by a solution of 3.35 g APS dissolved in 20 g DI water, and a rinse of 5 g DI water. After allowing the temperature to return to 84° C., the first monomer emulsion was fed to the flask over 15 minutes. Starting at the same time as the monomer emulsion 1 addition, a solution of 1.6 g APS dissolved in 40 g DI water was added linearly and separately over 75 minutes. Once the first monomer emulsion feed was complete, the jar containing the emulsion was rinsed with 25 g DI water, that rinse was added to the flask, and the contents of the flask were held at 84° C. for 25 minutes. After the 25 minute hold, the second monomer emulsion was fed to the flask over 35 minutes. Following the addition of the second monomer emulsion (and a 25 g rinse at the end of the feed), the contents of the flask were held at 84° C. for 20 minutes. After the 20 minute hold, a solution of 12 g (29% active) ammonium hydroxide and 10 g DI water was added to the flask linearly over a period of 10 minutes. After the ammonium hydroxide addition, the third monomer emulsion and an solution containing 1.4 g NaPS dissolved in 30 g DI water were added linearly and separately to the flask over a period of 65 minutes. The contents of the flask were maintained at a temperature of 83-84° C. during the addition of the third monomer emulsion. When all additions were complete, the jar containing the second monomer emulsion was rinsed with 25 g DI water, which was then added to the flask. The contents of the flask were cooled to 65° C. and a catalyst/activator pair was added to the flask. 37 g (42% solids) of TAMOL™ 2002 was added. The polymer was then neutralized to pH 7.5 with a dilute potassium hydroxide solution. The measured particle size was 97 nm and the solids were 46.7%.

EXAMPLE 1

Formation of composite particle containing aqueous coating compositions

| Material Name | Pounds |
|---|---|
| Second Polymer | 229.99 |
| Coalescent | 4.81 |
| Grind | |
| First polymer | 234.54 |
| Defoamer | 0.50 |
| Water | 61.43 |
| TiO2 slurry | 250.99 |
| Grind | |
| Water | 25.71 |
| Polycarboxylic acid dispersant @ 19.6% | 2.32 |
| Wetting surfctant | 2.49 |
| Defoamer | 1.00 |
| Then add while increasing speed for a good vortex: | |
| Extenders | 28.00 |
| Disperse for for 20 min | |
| LetDown | |
| Potassium Hydroxide (5%) | 1.00 |
| ROPAQUE ™ Opaque polymer | 65.00 |
| Defoamer | 1.00 |
| Polyurethane associative thickeners | 32 to 45 |
| Water | 105.84 |

COMPARATIVE EXAMPLE A

Formation of aqueous coating composition not of the invention

| Material Name | Pounds |
|---|---|
| Premix | |
| Comp. Emulsion polymer | 441.15 |
| Dispersants | 15.00 |
| Coalescent | 2.18 |
| Grind | |
| Water | 50.00 |
| Polycarboxylic acid dispersant @ 19.6% | 19.53 |
|  | 2.50 |
| Defoamer | 1.00 |
| Then add while increasing speed for a good vortex: | |
| TiO2 slurry | 295.0 |
| Extenders | 28.00 |
| Disperse for for 20 min | |
| LetDown | |
| Potassium Hydroxide (5%) | 1.00 |
| ROPAQUE ™ Opaque polymer | 60.00 |
| Defoamer | 1.00 |
| Polyurethane associative thickeners | 38 to 45 |
| Water | 136.57 |

First polymer i=emulsion polymer including as copolymerized units, 1.2%, by weight P-acid monomer, based on the weight of the emulsion polymer First polymer ii=emulsion polymer including as copolymerized units, 1.1%, by weight P-acid monomer, based on the weight of the emulsion polymer Polymer iii=emulsion polymer including as copolymerized units, 0%, by weight P-acid monomer, based on the weight of the emulsion polymer Second polymer a has composition of 17BA/75.7MAA/0.1Sty/7.5MAA//5MMP with a Fox Tg=68.0° C. and a calculated molecular weight=2488.

TABLE 1.1

Evaluation of freeze/thaw stability.

| | Composite | | |
|---|---|---|---|
| | First Polymer i/TiO2 | First Polymer i/TiO2 Letdown | First Polymer i/TiO2 |
| | First Polymer ii | Second polymer a | Polymer iii |
| Initial | 111 | 104 | 99 |
| Cycle 1 | Fail | 125 | Fail |
| Cycle 1 Condition | 1 Coagulated | 2 | 0 Solid |
| Cycle 3 | | 116 | |
| Cycle 3 Condition | | 2.5 | |
| Cycle 3 Delta KU | | 12 | |

The aqueous coating composition of the invention including composite particles, the composite particles including TiO2 and first polymer i, and second polymer a exhibit desirable freeze/thaw stability relative to the same composite particles not including second polymer.

EXAMPLE 2

Evaluation of hiding and tint strength of coatings. Aqueous coating compositions according to the formation of aqueous coatings, Example 1 and Comparative Example A, were formed and dried coatings formed therefrom. Coating 1 was formulated with 15% less TiO2 than Comparative Coating A. As can be seen in Table 2.1, Coating 1 of the invention has significantly better hiding and tint strength even with 15% less TiO2.

TABLE 2.1

Performance of dried coatings

| | Coating | |
|---|---|---|
| | Comp. A | 1 |
| Composite Particles | None | First Polymer i/TiO2 |
| Letdown vehicle | Second Polymer a | Second Polymer a |
| Hiding (S/mil) | 6.58 | 6.80 |
| Hiding standard deviation | 0.009 | 0.009 |
| Tint strength (Y) | 65.04 | 65.98 |

Coating 1 of the invention exhibits superior hiding and tint strength performance relative to that of Coating Comp. A absent the composite particles.

EXAMPLE 3

Evaluation of coatings including second polymer from different sources. Comparison of second polymer added neat with second polymer added as a stabilizer for an emulsion-polymerized third polymer.

TABLE 3.1

Compositions

| Polymer | Composition | pH | % Solids | P/S BI 90 (nm) |
|---|---|---|---|---|
| Second Polymer c | 23.0 (21.8BA/70.1MMA/8.0MAA/0.1STY)//5.05MMP | 9.2 | 49.3 | 122 |
| Third polymer | 77.0 (57.0BA/41.05MMA/1.95QM-1458)//0.1BMP | | | |
| Second polymer b | 16.3 BA/72.6 MMA/11.0 MAA/0.1 STY// 4.0 MMP | 3.4 | 39.4 | 89 |

TABLE 3.2

Evaluation of coatings

| | Coating | | |
|---|---|---|---|
| | Comp. B | 2 | 3 |
| Composite Particles Letdown | First Polymer i/TiO2 | | |
| | None | Second polymer b | Third polymer formed with second polymer c |
| 20° Gloss | 11.5 | 17.5 | 16.9 |
| 60° Gloss | 45.4 | 51.0 | 51.2 |
| S/mil | 6.52 | 6.68 | 6.92 |
| Std. dev. | 0.03 | 0.07 | 0.09 |
| Tint Strength | 94.5% | 100.3% | 100.4% |
| F/T Cycle 1 | Fail | 121 | 123 |
| Scrub cycles | 1076 | 698 | 868 |
| % of PPI | 103.7% | 67.3% | 83.7% |

Improved Freeze-thaw performance was achieved whether the second polymer was added as a stabilizer for the let down binder (third polymer) or as the free second polymer material. Free second polymer leads to lower scrub resistance.

EXAMPLE 4

Evaluation of aqueous coating compositions and dried coatings including composite particles formed from TiO2 and first polymer stabilized with various second polymers. First polymer i=emulsion polymer including as copolymerized units, 1.2%, by weight P-acid monomer, based on the weight of the emulsion polymer. The second polymer is included at a level of 10% by weight, based on the total weight of polymer in the aqueous coating composition in each instance in Table 4.1.

TABLE 4.1

Evaluation of various second polymers

| Second Polymer Composition | Fox Tg °C. | Calculated MW | Intial KU | Freeze Thaw Cycles, Measured KU Viscosity | | | | | Scrubs | Hiding S/Mil |
|---|---|---|---|---|---|---|---|---|---|---|
| | | | | Cycle 1 | Cycle 2 | Cycle 3 | Cycle 4 | Cycle 5 | | |
| 10 BA/80 MMA/10 MAA // 4 nDDM | 98 | 5050 | 113 | 115 | 116 | 111 | 117 | 113 | 953 | 7.0 |
| 10 BA/70 MMA/20 MAA // 10 nDDM | 91 | 2040 | 106 | 126 | 127 | 114 | 117 | 108 | 1107 | 6.9 |
| 10 BA/80 MMA/10 MAA // 10 nDDM | 98 | 2040 | 108 | 108 | 112 | 108 | 112 | 112 | 1210 | 6.9 |
| 10 BA/70 MMA/20 MAA // 4 nDDM | 91 | 5050 | 108 | 106 | 111 | 106 | 112 | 114 | 916 | 6.7 |
| 30 BA/55 MMA/15 MAA // 7 nDDM | 44 | 2890 | 106 | 138 | 133 | 127 | 134 | 125 | 1047 | 6.8 |
| 30 BA/55 MMA/15 MAA // 7 nDDM | 44 | 2890 | 108 | >140 | | | | | 1037 | 6.9 |
| 50 BA/40 MMA/10 MAA // 4 nDDM | 19 | 5050 | 105 | Fail | | | | | 829 | 6.9 |
| 50 BA/40 MMA/10 MAA // 10 nDDM | 19 | 2040 | 105 | Fail | | | | | 983 | 6.9 |
| 50 BA/30 MMA/20 MAA // 4 nDDM | 23 | 5050 | 106 | Fail | | | | | 805 | 6.6 |
| 50 BA/30 MMA/20 MAA // 10 nDDM | 23 | 2040 | 104 | Fail | | | | | 1130 | 6.7 |
| None | | | 101 | Fail | | | | | 1060 | 6.6 |

Aqueous coating compositions of the invention exhibited improved freeze/thaw stability relative to the same composition absent second polymer. The duplicate data points at Fox Tg=44° C. exhibited unacceptable (inconsistent) freeze/that stability. Dried coatings of the invention exhibited desirable levels of scrub resistance and hiding.

EXAMPLE 5

Evaluation of aqueous coating compositions and dried coatings including first polymer stabilized with various amounts of various second polymers. The first polymer is first polymer i=emulsion polymer including as copolymerized units, 1.2%, by weight P-acid monomer, based on the weight of the emulsion polymer.

TABLE 5.1

Effect of second polymer amount.

| Second polymer wt % | Second Polymer Fox Tg | Second polymer Compn. All 10 nDDM | Intial KU | Freeze Thaw Cycles, Measured KU Viscosity | | | | | ΔKU | S/ Scrubs | mil | Tint Strength |
|---|---|---|---|---|---|---|---|---|---|---|---|---|
| | | | | Cycle 1 | Cycle 2 | Cycle 3 | Cycle 4 | Cycle 5 | | | | |
| 5% (Comp.) | 121.9° C. | 95 MMA/5 MAA | 109 | Fail | | | | | | 1152 | 6.99 | 102.15% |
| 5% (Comp.) | 125.0° C. | 90 MMA/10 MAA | 110 | Fail | | | | | | 1063 | 6.89 | 101.35% |
| 5% (Comp.) | 72.8° C. | 20 BA/75 MMA/ 5 MAA | 109 | Fail | | | | | | 1049 | 6.98 | 103.17% |
| 5% (Comp.) | 74.8° C. | 20 BA/70 MMA/ 10 MAA | 108 | Fail | | | | | | 1030 | 6.88 | 102.15% |
| 10% | 96.8 C.° | 10 BA/82.5 MMA/7.5 MAA | 114 | 122 | 127 | 115 | 123 | 123 | 9 | 1127 | 7.01 | 107.00% |
| 10% | 96.8° C. | 10 BA/82.5 MMA/7.5 MAA | 114 | 115 | 119 | 110 | 121 | 120 | 6 | 1096 | 6.93 | 109.34% |
| 10% | 96.8° C. | 10 BA/82.5 MMA/7.5 MAA | 113 | 119 | 124 | 115 | 126 | 126 | 13 | 1052 | 6.92 | 107.00% |
| 15% | 121.9° C. | 95 MMA/5 MAA | 116 | 122 | 128 | 118 | 130 | 129 | 13 | 909 | 6.91 | 108.40% |
| 15% | 125.0° C. | 90 MMA/10 MAA | 117 | 122 | 122 | 114 | 125 | 125 | 8 | 798 | 7.08 | 108.95% |
| 15% | 72.8° C. | 20 BA/75 MMA/ 5 MAA | 115 | 122 | 129 | 117 | 125 | 126 | 11 | 1190 | 6.89 | 108.32% |
| 15% | 74.8° C. | 20 BA/70 MMA/ 10 MAA | 115 | 121 | 127 | 116 | 126 | 126 | 11 | 1113 | 6.99 | 107.23% |

Examples including 10% to 15% by weight, based on the total weight of polymer in the aqueous coating composition, second polymer provide good freeze/thaw performance and tint strength while comparatives including 5% by weight, based on the total weight of polymer in the aqueous coating composition, second polymer stage fail freeze/thaw stability.

EXAMPLE 6

Freeze/thaw stability and scrub resistance of coating compositions including first polymer/TiO2 composite particles with and without second polymer in a low VOC coating composition (flat paint formulation).

Formation of First Polymer iii. A first monomer emulsion was prepared by mixing 545 g DI water, 82.5 g (30% active) anionic Surfactant B, 456 g BA, 570 g EA, 802.75 g MMA, 38 g (65% active) PEM, 4.75 g MAA, 57 g (50% active) UMA, and 2.38 g n-DDM. A second monomer emulsion was prepared by mixing 25 g DI water, 2.6 g (30% active) anionic Surfactant B, 20 g BA, and 80 g MMA. The reactor was a 5-liter, four necked round bottom flask equipped with a paddle stirrer, a thermometer, nitrogen inlet, and a reflux condenser. To the flask was added 700 g DI water and 13.4 g (30% active) anionic Surfactant B. The contents of the flask were heated to 86° C. under a nitrogen atmosphere and stirring initiated. A solution of 3.2 g ammonium bicarbonate dissolved in 25 g DI water was added to the flask. A total of 81 g of the first emulsion monomer emulsion was then added, and this was followed by a solution of 4 g APS dissolved in 27 g DI water. After the reaction temperature peaked, a mixture made from a solution of 19.8 g 0.15% ferrous sulfate heptahydrate in water and a solution of 2.9 g 1% solution of ethylenediaminetetraacetic acid tetrasodium salt in water was added. Two cofeed solutions were then fed to the flask over a period of 85 minutes: the first cofeed solution was made from 4.0 g 85% t-amyl hydroperoxide, 1.2 g Surfactant B, and 95 g DI water, and the second cofeed solution was made from 3.08 g of isoascorbic acid and 100 g DI water. Two minutes after the start of cofeeds, the remaining first monomer emulsion was fed to the flask over 80 minutes while maintaining the temperature at 86° C. Once the first monomer emulsion feed was complete, the jar containing the emulsion was rinsed with DI water, that rinse was added to the flask, the contents of the flask were held at 86° C. for 15 minutes. After the 15 minute hold, the contents of the flask were cooled to 60° C. At 60° C., the second monomer emulsion was added to the flask, the jar containing the emulsion was rinsed with DI water, that rinse was added to the flask, a solution of 0.5 g 70% t-butyl hydroperoxide in 8 g DI water and a solution of 0.4 g isoascorbic acid in 12 g DI water were added in that order. A catalyst/activator pair were added to the flask. The polymer was then neutralized to pH 8.0 with an ammonium hydroxide solution. The measured particle size was 110 nm and the solids were 49.5%.

Formation of First Polymer iii Stabilized with Second Polymer d. A first monomer emulsion was prepared by mixing 5 g DI water, 2.6 g (30% active) anionic Surfactant B, 36 g BA, 143.9 g MMA, 20 g MAA, and 10.2 g of a mercaptan chain transfer agent. A second monomer emulsion was prepared by mixing 495 g DI water, 79.9 g (30% active) anionic Surfactant B, 476 g BA, 510 g EA, 629 g MMA, 34 g (65% active) PEM, 34 g acetoacetyloxyethyl methacrylate, and 34 g (50% active) UMA. A third monomer emulsion was prepared by mixing 25 g DI water, 2.6 g (30% active) anionic Surfactant B, 20 g BA, and 80 g MMA. The reactor was a 5-liter, four necked round bottom flask equipped with a paddle stirrer, a thermometer, nitrogen inlet, and a reflux condenser. To the flask was added 700 g DI water and 13.4 g (30% active) anionic Surfactant B. The contents of the flask were heated to 86° C. under a nitrogen atmosphere and stirring initiated. A buffer solution of 2.1 g sodium carbonate dissolved in 25 g DI water was added to the flask. A total of 81 g of the first emulsion monomer emulsion was then added, and this was followed by a solution of 4 g APS dissolved in 27 g DI water. After the reaction temperature peaked, a mixture made from a solution of 19.8 g 0.15% ferrous sulfate heptahydrate in water and a solution of 2.9 g 1% solution of ethylenediaminetetraacetic acid tetrasodium salt in water was added. Two cofeed solutions were then fed to the flask over a period of 85 minutes: the first cofeed solution was made from 4.0 g 85% t-amyl hydroperoxide, 1.2 g Surfactant B, and 95 g DI water, and the second cofeed solution was made from 3.08 g of isoascorbic acid and 100 g DI water. Two minutes after the start of cofeeds, the remaining first monomer emulsion was fed to the flask over 15 minutes while maintaining the temperature at 86° C. Once the first monomer emulsion feed was complete, the jar containing the emulsion was rinsed with DI water, that rinse was added to the flask, the contents of the flask were held at 86° C. for 20 minutes and the cofeeds were suspended. After the 20 minute hold, the cofeeds were resumed, and the second monomer emulsion was fed to the flask over 65 minutes. When 34% of the second monomer emulsion was added, A solution of 23.5 g 45% potassium hydroxide in 50 g DI water was added to the second monomer emulsion. Following the addition of the second monomer emulsion, the jar containing the emulsion was rinsed with DI water, that rinse was added to the flask, the contents of the flask were held at 86° C. for 15 minutes. After the 15 minute hold, the contents of the flask were cooled to 60° C. At 60° C., the third monomer emulsion was added to the flask, the jar containing the emulsion was rinsed with DI water, that rinse was added to the flask. A solution of 0.5 g 70% t-butyl hydroperoxide in 8 g DI water and a solution of 0.4 g isoascorbic acid in 12 g DI water were added in that order. A catalyst/activator pair were added to the flask. The polymer was then neutralized to pH 8.1 with an ammonium hydroxide solution. The measured particle size was 124 nm and the solids were 49.5%.

TABLE 6.1

Formation of aqueous coating compositions

| Material Name | Pounds | Gallons |
|---|---|---|
| Grind | | |
| Water | 90.00 | 10.78 |
| TAMOL™ 165A | 18.89 | 2.14 |
| Potassium Hydroxide (10%) | 2.00 | 0.22 |
| Defoamer | 1.00 | 0.12 |
| Grind Surfactant | 4.11 | 0.42 |
| Dispersant 1 | 1.00 | 0.05 |
| Dispersant 2 | 1.00 | 0.12 |
| TiO2 Slurry | 125.00 | 6.41 |
| Extender 1 | 85.00 | 3.90 |
| Extender 2 | 85.00 | 4.62 |
| Extender 3 | 3.00 | 0.15 |
| Dispersed 20 minutes; then added the following: | | |
| Extender 4 | 20.00 | 1.04 |
| TiO2 Slurry | 141.27 | 7.24 |
| Mixed at low speed for 10 minutes. | | |
| Grind Sub-total | 577.27 | 37.23 |

TABLE 6.1-continued

Formation of aqueous coating compositions

| Material Name | Pounds | Gallons |
|---|---|---|
| LetDown | | |
| Polymer(s) | 377.93 | 42.34 |
| Water | 40.00 | 4.79 |
| Defoamer | 1.00 | 0.12 |
| OPTIFILM™ Enhancer 400 | 10.12 | 1.26 |
| Add Grind Here | | |
| ROPAQUE™ Ultra E | 40.97 | 4.79 |
| Rheology Modifier 1 | 28.00 | 3.25 |
| Rheology Modifier 2 | 2.00 | 0.23 |
| Water | 50.00 | 5.99 |
| Mixed for 10 minutes after last addition. | | |

TAMOL™ dispersant and ROPAQUE™ opaque polymeric pigment are trademarks of the Dow Chemical Company.
OPTIFILM™ coalescent is a trademark of Eastman Chemical Company.

TABLE 6.2

Freeze/thaw stability of aqueous coating compositions at low VOC and scrub resistance of dried coatings formed therefrom

| Polymer(s) | First Polymer iii (Comparative) | First polymer iii stabilized with second polymer d |
|---|---|---|
| Initial KU | 105 | 112 |
| Cycle 1 KU | FAIL | 114 |
| Δ KU | | 2 |
| Rating, Syneresis | Solid | 5, syn |
| Cycle 2 KU | | 115 |
| Δ KU | | 3 |
| Rating, Syneresis | | 4, syn |
| Cycle 3 KU | | 114 |
| Δ KU | | 2 |
| Rating, Syneresis | | 4, syn |
| Scrub Resistance | 817 | 1056 |

Compositions of the invention provided excellent freeze/thaw stability at low VOC while maintaining very good scrub resistance, relative to a comparative composition.

What is claimed is:

1. An aqueous coating composition comprising:
    a) a composite particle comprising an opacifying pigment particle and a plurality of particles of a first polymer, said first polymer being an emulsion polymer comprising, as copolymerized units, from 0.35% to 5%, by weight P-acid monomer, based on the weight of said emulsion polymer; and
    b) from 7% to 25% by weight, based on the total weight of polymer in said aqueous coating composition, second polymer comprising, as copolymerized units, from 5% to 20%, by weight based on the weight of said second polymer, carboxylic acid monomer,
    wherein said second polymer has a calculated Tg of from 50° C. to 150° C.,
    wherein said second polymer is substantially free from copolymerized P-acid monomer, and
    wherein said second polymer has a calculated molecular weight of from 2000 to 5500.

2. The aqueous coating composition of claim 1 wherein said opacifying pigment particle is $TiO_2$.

3. A method for forming an aqueous coating composition comprising:
    a) forming a first polymer, said first polymer being an emulsion polymer comprising, as copolymerized units, from 0.35% to 5%, by weight P-acid monomer, based on the weight of said emulsion polymer;
    b) contacting an opacifying pigment particle with a plurality of particles of said first polymer to form a composite particle;
    c) contacting said composite particle with from 7% to 25% by weight, based on the total weight of polymer in said aqueous coating composition, second polymer comprising, as copolymerized units, from 5% to 20%, by weight based on the weight of said second polymer, carboxylic acid monomer,
    wherein said second polymer has a calculated Tg of from 50 C. to 150 C.,
    wherein said second polymer is substantially free from copolymerized P-acid monomer, and
    wherein said second polymer has a calculated molecular weight of from 2000 to 5500.

4. The method for forming the aqueous coating composition of claim 3
    wherein said opacifying pigment particle is $TiO_2$.

5. A method for providing a coating comprising
    (a) forming the aqueous coating composition of claim 1 or claim 2;
    (b) applying said aqueous coating composition to a substrate; and
    (c) drying, or allowing to dry, said applied aqueous coating composition.

6. A coating formed by the method of claim 5.

* * * * *